(12) United States Patent
Song et al.

(10) Patent No.: US 10,481,419 B1
(45) Date of Patent: Nov. 19, 2019

(54) PHYSICALLY CONTACTABLE GRAPHENE ELECTRO-OPTIC MODULATOR AND METHOD FOR MANUFACTURING THE SAME

(71) Applicant: KOREA INSTITUTE OF SCIENCE AND TECHNOLOGY, Seoul (KR)

(72) Inventors: Yong-Won Song, Seoul (KR); Sungjae Lee, Seoul (KR)

(73) Assignee: KOREA INSTITUTE OF SCIENCE AND TECHNOLOGY, Gyeonggi-Do (KR)

( * ) Notice: Subject to any disclaimer, the term of this patent is extended or adjusted under 35 U.S.C. 154(b) by 0 days.

(21) Appl. No.: 16/249,900

(22) Filed: Jan. 17, 2019

(30) Foreign Application Priority Data

May 9, 2018 (KR) .................. 10-2018-0053138

(51) Int. Cl.
*G02F 1/01* (2006.01)

(52) U.S. Cl.
CPC .................. *G02F 1/0118* (2013.01)

(58) Field of Classification Search
CPC ...... G02F 1/0118; G02F 1/00; G02F 1/00009; G02F 1/0018; G02F 1/0081; G02F 1/01; G02F 1/0102; G02F 1/011; G02F 1/03; G02F 1/0305; G02F 1/0316; G02F 1/0327; G02F 1/0344; G02F 1/035
See application file for complete search history.

(56) References Cited

U.S. PATENT DOCUMENTS

| 9,893,219 B2 * | 2/2018 | Suzuki .................. H01L 31/028 |
| 2012/0267041 A1 | 10/2012 | Woo et al. |
| 2013/0101247 A1 | 4/2013 | Cho et al. |
| 2017/0088944 A1 * | 3/2017 | Sultana .................. C23C 16/26 |

(Continued)

FOREIGN PATENT DOCUMENTS

| KR | 1020120119789 A | 10/2012 |
| KR | 1020130042906 A | 4/2013 |

(Continued)

OTHER PUBLICATIONS

Geunsoo Jang, "Changes in characteristics Graphene Field Effect Transistors by surface treatment and strain," Master's thesis, Ajou University, 2016, pp. 1-98, English abstract on pp. 97-98.

(Continued)

*Primary Examiner* — John Bedtelyon
(74) *Attorney, Agent, or Firm* — Cantor Colburn LLP

(57) ABSTRACT

Embodiments are directed to a method for manufacturing a graphene electro-optic modulator, which is freely attachable to and detachable from an optical waveguide and modulates a light according to an electric signal. The method includes: forming two metal electrodes on an oxide film formed on a substrate, the two metal electrodes being spaced apart from each other; synthesizing a first graphene film at a metal foil; coating the first graphene film with a polymer membrane; removing the metal foil at which the first graphene film is synthesized; and transferring the first graphene film coated with the polymer membrane onto the oxide film, wherein the first graphene film is electrically connected to any one of the two metal electrodes. There is also provided a graphene electro-optic modulator manufactured by the method.

12 Claims, 23 Drawing Sheets

(56) References Cited

U.S. PATENT DOCUMENTS

| | | | |
|---|---|---|---|
| 2017/0243875 A1 | 8/2017 | Khan | |
| 2019/0027889 A1* | 1/2019 | Song | C30B 25/105 |
| 2019/0137795 A1* | 5/2019 | Wong | G02B 6/42 |
| 2019/0155068 A1* | 5/2019 | Dalir | G02F 1/035 |

FOREIGN PATENT DOCUMENTS

| | | |
|---|---|---|
| KR | 1020140075404 A | 6/2014 |
| KR | 1020150023227 A | 3/2015 |
| WO | 2013186985 A1 | 12/2013 |

OTHER PUBLICATIONS

Christopher T. Phare et al., "Graphene electro-optic modulator with 30 GHz bandwidth" Nature Photonics, 2015, pp. 511-514, vol. 9.
Hamed Dalir et al., "Athermal Broadband Graphene Optical Modulator with 35 GHz Speed", ACS Photonics, 2016, pp. 1564-1568, vol. 3, No. 9.
Ming Liu et al., "A graphene-based broadband optical modulator", Nature, Jun. 2, 2011, pp. 64-67, vol. 474.

\* cited by examiner

PHYSICALLY CONTACTABLE GRAPHENE ELECTRO-OPTIC MODULATOR AND METHOD FOR MANUFACTURING THE SAME

CROSS-REFERENCE TO RELATED APPLICATION

This application claims priority to Korean Patent Application No. 10-2018-0053138, filed on May 9, 2018, and all the benefits accruing therefrom under 35 U.S.C. § 119, the contents of which in its entirety are herein incorporated by reference.

BACKGROUND

1. Field

The present disclosure relates to a graphene electro-optic modulator capable of being mounted or detached as desired by means of a physical contact, and more particularly, to a graphene electro-optic modulator applicable to a reconfigurable optical system by modulating an input light signal when physically contacting an optical waveguide and not modulating an input light signal when not physically contacting the optical waveguide, and a method for manufacturing the graphene electro-optic modulator.

DESCRIPTION ABOUT NATIONAL RESEARCH AND DEVELOPMENT SUPPORT

This study was supported by National Research Foundation of Korea (Project Name. Study of ultra-high speed photonics device based on phosphorus black, Project No. 1711052009) under the superintendence of Ministry of Science and ICT, Republic of Korea.

2. Description of the Related Art

In the modern society in which people enjoy various modern conveniences through a high speed communication network, large capacity data storage and high speed data processing and management are essentially required. In order to realize this, it is necessary to develop optical devices which are able to operate at high speed and are highly integrated. In recent years, it has been attempted to develop optical elements having the above characteristics by using nanomaterials having a large optical nonlinearity.

Among many nanomaterials, graphene having a hexagonal array of single-layer carbon atoms has excellent physical, electrical and optical properties. More specifically, graphene has very high charge mobility of 200,000 $cm^2V^{-1}s^{-1}$ or above at room temperature and absorbs about 2.3% of the incident light at a broad wavelength band from ultraviolet to visible light in a single layer. In particular, graphene is applicable to optical, optoelectronic and electro-optical applications due to its high tertiary nonlinearity and linear distribution of Dirac-fermions. For example, by controlling the voltage applied to the graphene, electrons may transfer between the bands of the graphene by shifting the Fermi level of the graphene. This transition control may achieve an electro-optic absorption characteristic, and thus it is possible to implement a compact electro-optic modulator capable of ultra-fast operation over a broad wavelength range.

However, unfortunately, the electro-optic modulators reported so far are fixed to nano-material based integrated optical devices or optical waveguides, and thus it is impossible to control the number or position of optical data channels as required by a user.

In order to realize a more efficient dynamic optical network, it is necessary to adaptively control the number and position of optical data channels to maximize the data processing function even when a limited number of optical elements are used. To this end, the electro-optic modulator should be adaptably applicable to optical waveguides.

RELATED LITERATURES

Patent Literature (Patent Literature 1) Korean Unexamined Patent Publication No. 10-2013-0042906

SUMMARY

The present disclosure is directed to providing a physically contactable graphene electro-optic modulator, which is applicable to an optical waveguide.

In addition, the present disclosure is directed to providing a method for manufacturing the graphene electro-optic modulator.

In one aspect, there is provided a method for manufacturing a graphene electro-optic modulator that modulates a light according to an electric signal, the method comprising: forming two metal electrodes on an oxide film formed on a substrate, the two metal electrodes being spaced apart from each other; synthesizing a first graphene film at a metal foil; coating the first graphene film with a polymer membrane; removing the metal foil at which the first graphene film is synthesized; and transferring the first graphene film coated with the polymer membrane onto the oxide film. Here, the first graphene film is electrically connected to any one of the two metal electrodes.

In an embodiment, the method may further comprise: synthesizing a second graphene film at a metal foil; coating the second graphene film with a polymer membrane; removing the metal foil at which the second graphene film is synthesized; and transferring the second graphene film coated with the polymer membrane onto the polymer membrane coated on the first graphene film. Here, the second graphene film may be electrically connected to the metal electrode to which the first graphene film is not connected.

In an embodiment, the synthesizing the first graphene film may include: growing graphene films on both surfaces of the metal foil; and removing the graphene film grown on one surface of the metal foil. Here, the first graphene film may be the graphene film not removed.

In an embodiment, the coating the first graphene film with a polymer membrane may be performed before the removing the graphene film.

In an embodiment, the method may further comprise coating a part of the oxide film and one of the metal electrode with a polymer membrane, before transferring the first graphene film.

In an embodiment, the method may further comprise heating the polymer membrane, after transferring the first graphene film.

In another aspect of the present disclosure, there is also provided a graphene electro-optic modulator for modulating a light according to an electric signal, comprising: an oxide film formed on a substrate; two metal electrodes disposed on the oxide film to be spaced apart from each other; a first graphene film transferred onto the oxide film; and a first polymer membrane coated on the graphene film. Here, the first graphene film is electrically connected to any one of the two metal electrodes.

In an embodiment, the graphene electro-optic modulator may further comprise: a second graphene film transferred onto the first polymer membrane; and a second polymer membrane coated on the second graphene film. The second graphene film may be electrically connected to the metal electrode to which the first graphene film is not connected.

In an embodiment, the graphene electro-optic modulator may further comprise a second polymer membrane provided between the first graphene film and the oxide film.

In an embodiment, the first polymer membrane may be made of PMMA.

In an embodiment, the PMMA may have a molecular weight of 996 K.

In an embodiment, the first graphene film may have an area of 60 mm$^2$.

In another aspect of the present disclosure, there is also provided a system, comprising: a graphene electro-optic modulator according to the above embodiments; an oscillator configured to oscillate a light signal; a generator configured to generate the electric signal; an amplifier configured to amplify the electric signal; a bias tee configured to apply a bias voltage to the electro-optic modulator based on the electric signal; and an optical waveguide having a core and a cladding layer. Here, the cladding layer may be at least partially polished, and the graphene electro-optic modulator may be in contact with the polished portion of the cladding layer.

The electro-optic modulator manufactured according to an embodiment of the present disclosure may physically contact an optical fiber having a polished side cladding layer (a D-shaped fiber). If so, it is possible to interact with light traveling inside the optical fiber through an evanescent field extended outside the optical waveguide. As a result, the electro-optic modulator modulates the light travelling through the optical waveguide when it physically contacts the corresponding portion of the optical waveguide, and does not perform the modulation function when it does not contact the corresponding portion.

Since the electro-optic modulator may freely contact a portion desired by the user, it is possible to apply a small number of electro-optic modulators to a plurality of optical circuits and systems. In addition, such a non-blocking scheme improves the threshold at which optical elements interacting with each other due to light intensity are not damaged, and provides a basis for optical elements to be applied while allowing optical reconfiguration.

In addition, even though the number of modulators is limited, the limited number of modulators are applicable to a greater number of optical systems, and further, the modulation position and the number of optical signal channels to be modulated may be additionally controlled. For example, it is possible to perform multi-channel modulation or broadcasting modulation.

Moreover, since the intensity of the extended evanescent field decreases exponentially as the distance increases from the core of the optical waveguide, the operation of the modulator may be controlled by changing the distance between the electro-optic modulator and the optical waveguide.

Further, the electro-optic modulator may have a light extinction ratio of up to 20 dB and an operating speed in MHz.

The effects of the present disclosure are not limited to the above, and other effects not mentioned herein may be clearly understood by those skilled in the art from the appended claims.

BRIEF DESCRIPTION OF THE DRAWINGS

In order to more clearly describe the present disclosure or the technical solution to the conventional techniques, the drawings necessary to describe the embodiments will be briefly introduced below. It should be understood that the following drawings are for purposes of illustrating the embodiments of the present disclosure and are not intended to limit the same. In addition, for clarity of description, some elements to which various modifications such as exaggeration, omission or the like are applied may be shown in the following drawings.

DETAILED DESCRIPTION

The terms in the present disclosure are used only to illustrate definitive embodiments and are not intended to limit the present disclosure. The singular expression as used in the present disclosure and the appended claims is intended to include a plural expression, unless the context clearly dictates otherwise. In addition, it should be understood that the term "and/or" used in the present disclosure includes any one item, or any possible combination of a plurality of listed items.

When it is cited that any component is at an "upper portion" of another component, the component may be directly on the top of another portion, or any other component may be interposed therebetween. In contrast, when it is cited that any component is directly at an "upper portion" of another component, any other component is not interposed therebetween.

The terms "first", "second", "third" and the like are used to describe various portions, components, regions, layers, and/or sections, but are not limited thereto. These terms are only used to distinguish any portion, component, region, layer or section from another portion, component, region, layer or section. Accordingly, a first portion, component, region, layer or section described below may also be referred to as a second portion, component, region, layer or section without departing from the scope of the present disclosure.

The terminology used herein is for the purpose of describing particular embodiments only and is not intended to limit the present disclosure. The singular forms used herein include plural forms as well, provided that the phrases do not expressly have the opposite meaning. The meaning of the term "include" used in the specification is to specify a particular feature, region, integer, step, operation, element and/or component and is not to exclude the presence or addition of other features, regions, integers, steps, operations, elements, and/or components.

Unless otherwise defined, all terms including technical and scientific terms used herein have the same meaning as commonly understood by those skilled in the art. The terms defined in the dictionaries commonly used in the art are further interpreted as having meanings consistent with the relevant technical literature and the present disclosure, and are not to be construed as ideal or very formal meanings unless defined otherwise.

Hereinafter, embodiments of the present disclosure will be described in detail with reference to the drawings.

Figure 1A:
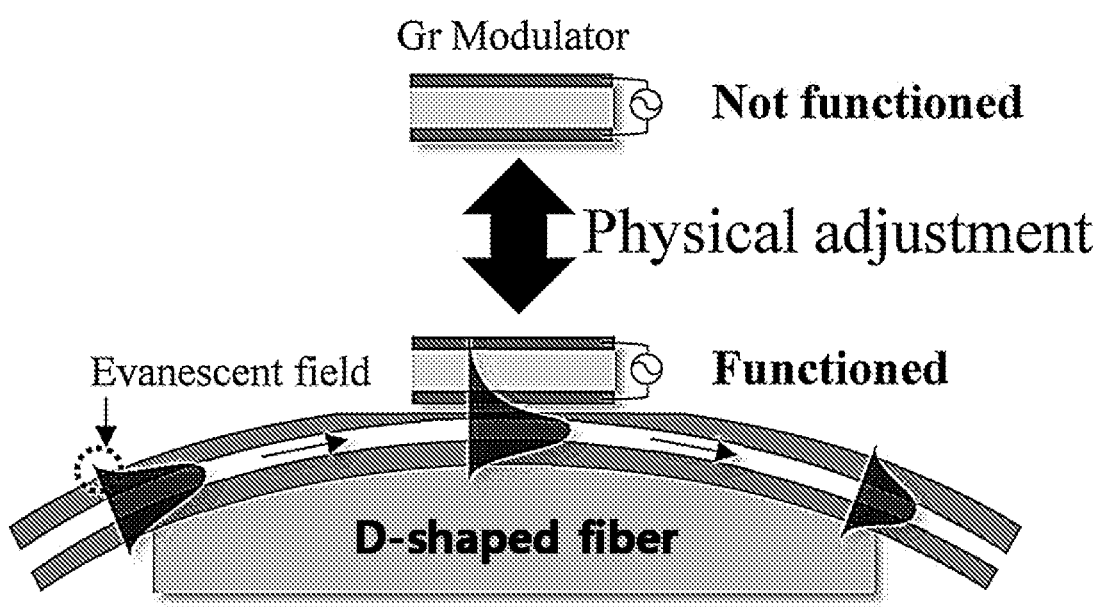
FIGS. 1A and 1B are diagrams exemplarily showing an operation of an electro-optic modulator according to an embodiment of the present disclosure.
Figure 1B:
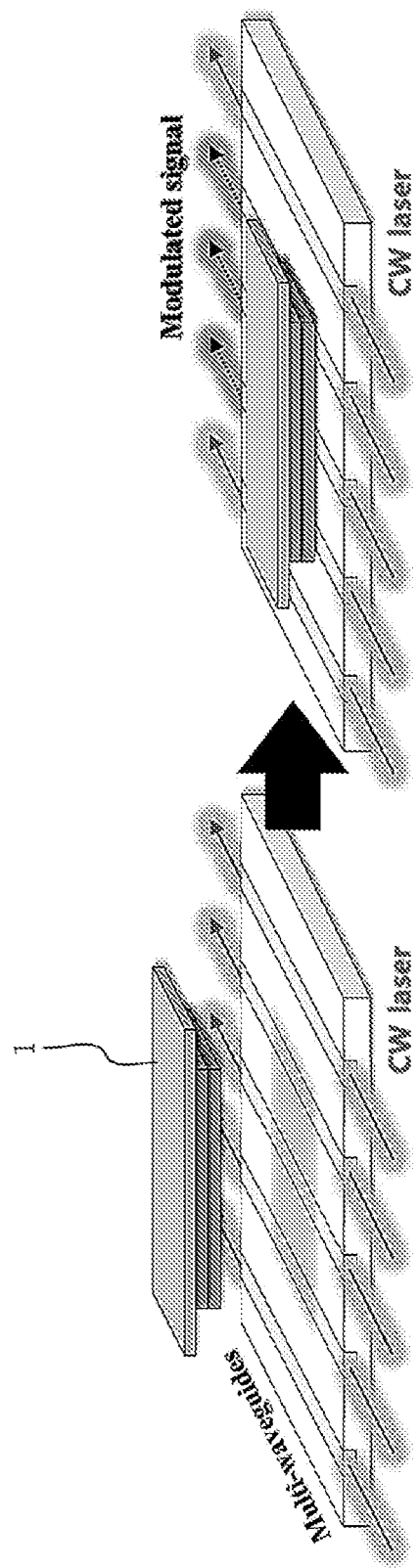

FIGS. 1A and 1B are diagrams exemplarily showing an operation of an electro-optic modulator according to an embodiment of the present disclosure.

Referring to FIGS. 1A and 1B, graphene is included as a saturable absorption material, with a graphene capacitor structure of graphene-polymer-graphene.

An electro-optic modulator 1 having the graphene capacitor structure may perform an electro-optic modulation function by controlling a Fermi energy level of the graphene by means of a voltage load applied to the graphene to change the light absorption characteristic of the graphene.

Figure 2:
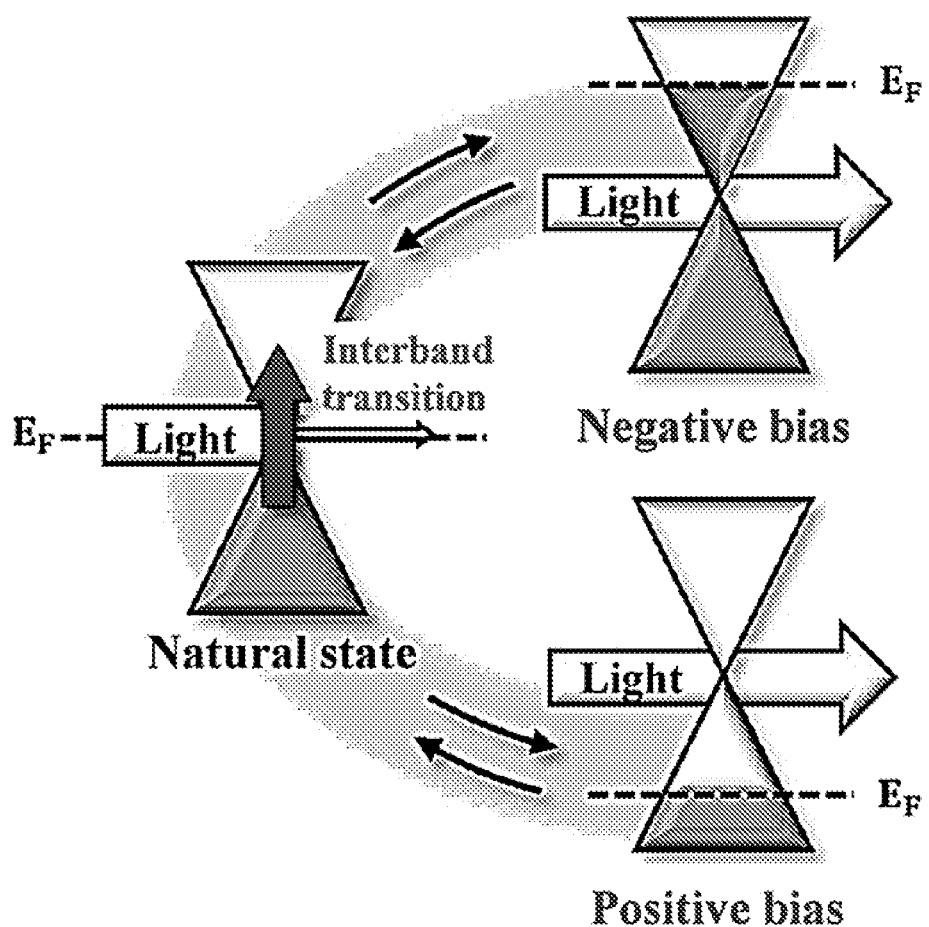
FIG. 2 is a diagram schematically showing an operation principle of the electro-optic modulator according to an embodiment of the present disclosure.

FIG. 2 is a diagram schematically showing an operation principle of the electro-optic modulator according to an embodiment of the present disclosure.

The carrier concentration of the graphene, which changes when a voltage is applied to an electrode connected to two graphene having a graphene capacitor structure, depends on the dielectric constant and thickness of the dielectric substance used in the graphene capacitor structure and the voltage applied to the graphene, and may be expressed as follows.

$$n_s = \frac{\varepsilon_0 \varepsilon_{ox}}{de}(V + V_0)$$ [Equation 1]

Here, $n_s$ represents a carrier concentration of graphene, V represents a voltage applied to the graphene, $V_0$ represents an offset voltage according to doping in a natural state of the graphene, d represents a thickness of the dielectric layer, and $\varepsilon_{ox}$ represents a dielectric permittivity of the dielectric layer.

The change of the carrier concentration of graphene according to the load voltage affects the shifting of the Fermi energy level of the graphene, and may be expressed as follows.

$$E_F = h v_F \sqrt{\pi \cdot n_s}$$ [Equation 2]

$E_F$ represents a Fermi energy level of the graphene, h represents a Dirac constant, and $v_F$ represents a Fermi velocity ($\sim 1.1 \times 10^6$ ms$^{-1}$) of the graphene. The Fermi energy level of the graphene shifts in proportion to the carrier concentration of the graphene.

Thus, if a negative or positive voltage is applied to the graphene, the Fermi level shifts. In a state where the Fermi level is shifted by more than a half of the incident photon energy, the photon is not absorbed to the graphene and thus the light is not absorbed. This is because the Fermi level has already shifted and thus the inter-band transition due to photon absorption is difficult. As shown in a right side of FIG. 2, the graphene to which a negative or positive voltage is applied has a transparent characteristic to light.

Meanwhile, if no voltage is applied, the Fermi level is located near a Dirac point. In this case, the graphene may absorb photons for band shifting of electrons, and thus the graphene may absorb light. As shown at a left side of FIG. 2, the graphene in a natural state has a characteristic of absorbing light.

Referring to FIG. 1A again, the intensity distribution of the light signal propagating inside the optical waveguide has a Gaussian distribution that maximizes in the core. If the cladding at the side surface of the optical waveguide is polished, the evanescent field, which extends out of the core due to the reduction of the effective refractive index, expands further out of the optical waveguide. The above-described characteristics of the graphene may be utilized even when the intensity of the light signal is relatively small. Thus, the electro-optic modulator 1 may interact with the light signal propagating inside the optical waveguide through the evanescent field of the light signal expanded to the outside.

As shown in FIG. 1A, the electro-optic modulator 1 may physically contact the optical fiber having a polished side cladding layer (the D-shaped fiber). If so, at least one of the graphenes that are the source of the electro-optic absorption characteristic of the electro-optic modulator 1 is able to interact with the light traveling inside the optical fiber due to the expansion of the evanescent field. The electro-optic modulator 1 modulates the light signal travelling through the optical waveguide when it physically contacts the corresponding portion of the optical waveguide, and does not perform the modulation function when it does not contact.

In an embodiment, the interaction between the graphene serving as the origin of the electro-optic absorption characteristic of the electro-optic modulator 1 and the light signal traveling along the optical waveguide may be controlled by changing the distance between the graphene and the optical waveguide.

In this way, the electro-optic modulator 1 may freely contact a necessary portion of the user, and thus it is possible to apply a smaller number of electro-optic modulators to a plurality of optical circuits and systems. In addition, such a non-blocking scheme improves the threshold at which optical elements interacting with each other are not damaged due to light intensity, and provides a basis for allowing optical elements to be applied in a reconfigurable way.

In addition, since the intensity of the expanded evanescent field decreases exponentially as the distance increases from the core of the optical waveguide, the operation of the modulator may be controlled by changing the distance between the electro-optic modulator 1 and the optical waveguide.

In an embodiment, since the electro-optic modulator 1 is detachable, the position and number of optical waveguides to be contacted may be controlled. Referring to FIG. 1B again, the electro-optic modulator 1 operated in the above principle may be physically attached to or detached from the optical waveguide and be movable. Thus, it is possible to control the position and number of channels for transmitting the same data stream according to the design and contact position of the electro-optic modulator 1.

Thus, if the electro-optic modulator 1 is applied to various systems which have one or more light signal paths before modulation and one or more light signal paths after modulation, it is possible to perform multi-channel modulation and broadcasting modulation.

Further, the electro-optic modulator 1, which is a reconfigurable optical device, may allow easy management in view of repair and maintenance since it ensures maximized efficiency of the data transmission process through multiple channels, stable operation of a simple device structure, and inspection and replacement of individual devices.

In addition, if the optical waveguide is an optical fiber, the electro-optic modulator 1 may allow a transmission rate of a Tbps level due to a high carrier frequency, and allows repeaterless transmission over 100 km due to a low loss of about 0.2 dB/km. Further, the electro-optic modulator 1 has the advantage of a long distance communication system based an optical fiber, which is easy to install and is free from interference by external electromagnetic fields.

Figure 3:
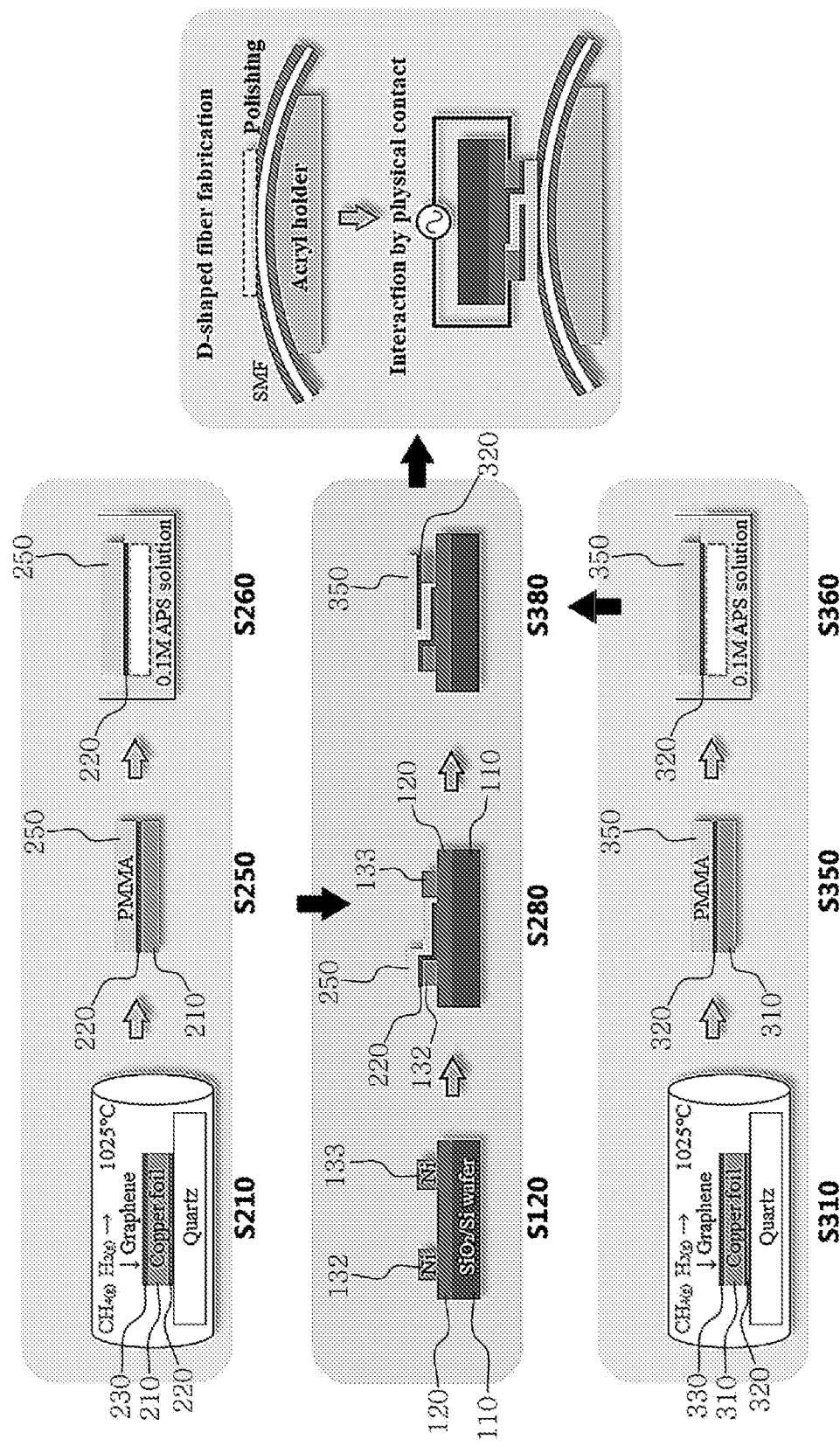
FIG. 3 is a schematic view for illustrating a method for manufacturing an electro-optic modulator according to an embodiment of the present disclosure.

FIG. 3 is a schematic view for illustrating a method for manufacturing an electro-optic modulator according to an embodiment of the present disclosure. The electro-optic modulator 1 having the above-described functions may be manufactured through the steps of FIG. 3.

First, a substrate to be used as the electro-optic modulator 1 is prepared. In an embodiment, the substrate is prepared by the following steps: forming an oxide film 120 on a substrate 110 (S110), and forming two metal electrodes 132, 133 on the oxide film 120 (S120).

In an embodiment, the substrate 100 is made of silicon (Si), and the metal electrodes 132, 133 are made of nickel (Ni). The metal electrodes 132, 133 are disposed to be spaced apart from each other as shown in FIG. 3 by means of electron beam evaporation.

After that, graphene to be transferred to the substrate is synthesized. In an embodiment, two graphenes to be transferred may be prepared.

The graphene film 220 to be transferred is synthesized at a metal foil 210 (S210). In an embodiment, the metal foil 210 is made of copper (Cu), and the graphene film 220 is synthesized on the copper foil 210 by means of chemical vapor deposition (CVD).

In an embodiment, the graphene film 220 is prepared by the following steps. First, the graphene films 220, 230 are synthesized on both surfaces of the copper foil 210 (S210). When the graphene films are synthesized on the copper foil by means of the CVD, the graphene films 220, 230 are synthesized on both surfaces of the copper foil. The graphene 230 synthesized on one surface is inferior to the graphene 220 synthesized on the other surface. Thus, in order to use the graphene film 220 with a relatively high quality for manufacturing the electro-optic modulator 1, the graphene film 220 is transferred onto the substrate (S280).

Since the modulation efficiency of the electro-optic modulator 1 depends on the quality of the graphene completely transferred through the transferring process, it is important to improve the quality of the graphene to be transferred.

Figure 4A:
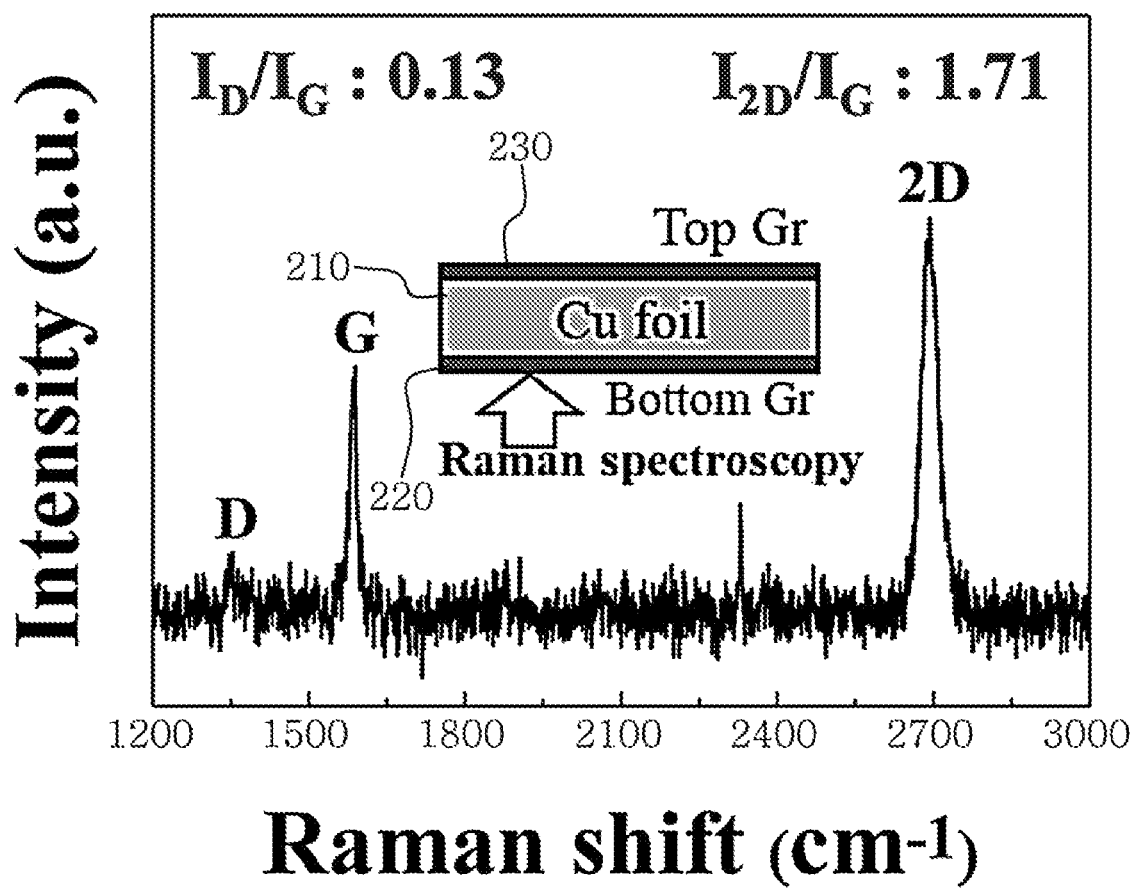
FIGS. 4A to 4C are diagrams showing a preprocessing process applied to transfer a graphene film and its result according to an embodiment of the present disclosure.
Figure 4B:
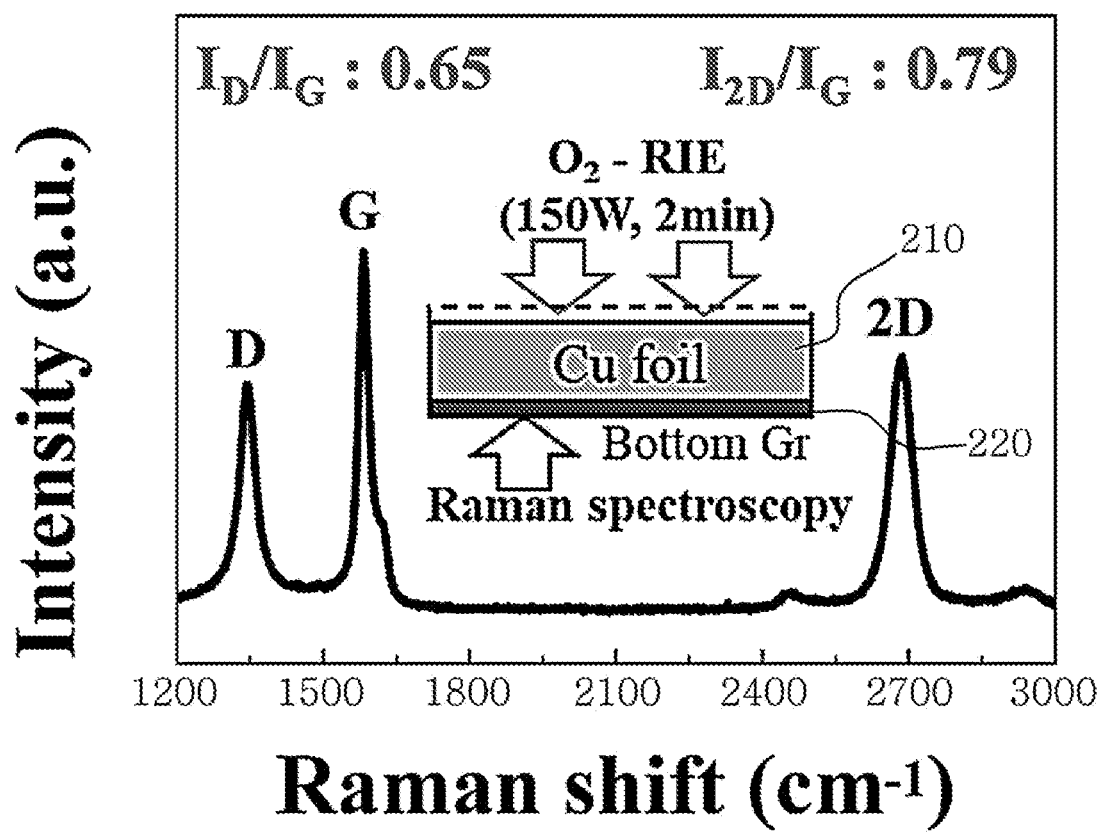
Figure 4C:
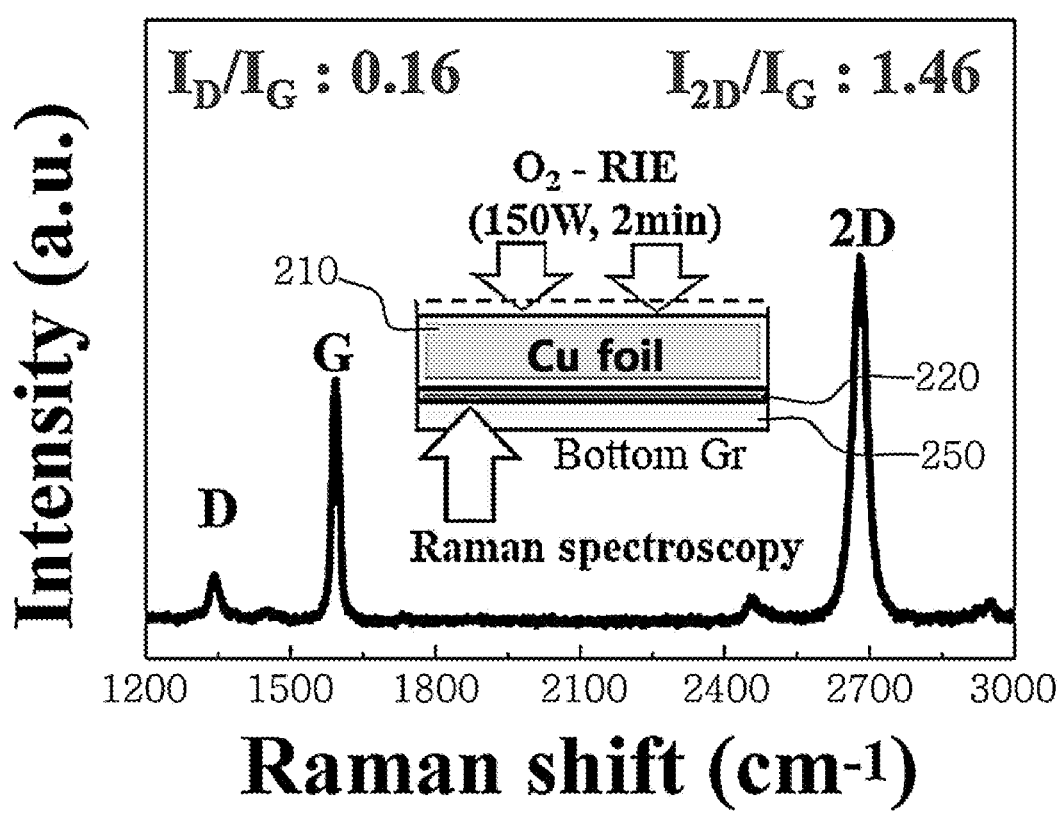

FIGS. 4a to 4C are diagrams showing a preprocessing process applied to transfer the graphene film 220 and its result according to an embodiment of the present disclosure.

In the transferring step (S280), the copper foil 210 is removed using an etching solution (S260), and the graphene film 220 is transferred (S280). In this process, if the graphene film 230 remains, the remaining graphene film acts as an obstacle to the copper etching solution and disturbs high-quality transfer. Even though the high quality graphene film 220 having a Raman spectrum result as shown in FIG. 4A is synthesized on the copper foil 210 before the transferring process, the quality of the graphene film 220 may be damaged depending on whether the polymer coating is performed. FIG. 4B shows the Raman spectrum of the high quality graphene film 220 not coated with the polymer membrane 250 before the graphene film 230 is removed. FIG. 4C shows the Raman spectrum of the high quality graphene film 220 coated with the polymer membrane 250 before the graphene film 230 is removed. If the Raman spectrums of FIG. 4B and FIG. 4C are compared, it can be found that the quality of the graphene in the example of FIG. 4B is damaged where the graphene film 220 is not protected by the polymer membrane 250.

Thus, in order to improve the modulation efficiency of the electro-optic modulator 1, as shown in FIGS. 3 and 4C, before the graphene film 230 is removed, the polymer membrane 250 is coated on the high quality graphene film 220 (S250). In an embodiment, the graphene film 230, which is a relatively low quality graphene film and synthesized on the upper surface of the copper foil 210 is removed by accelerated plasma through $O_2$-RIE (reactive ion etching).

If the copper foil 210 on both surfaces of which the graphene films 220, 230 are synthesized are subjected to $O_2$-RIE treatment, the graphene film 220 to be transferred and formed at the opposite side is also damaged. Meanwhile, if the $O_2$-RIE treatment is performed after coating with the polymer membrane 250, it is possible to prevent the graphene 220 from being damaged.

In an embodiment, the polymer membrane 250 may be made of poly(meth)acrylates (PMMA). The polymer membrane 250 made of PMMA serves as a support layer during the transferring process onto the graphene film 220 and is formed by spin coating. The operating efficiency and operating speed of the electro-optic modulator 1 having the graphene capacitor structure depend on an area of the capacitor structure and a thickness of the dielectric layer. The area of the capacitor is determined by the PMMA/graphene composite region, and the dielectric layer is determined by the thickness of the PMMA that has been spin-coated. Thus, the performance of the electro-optic modulator 1 may be designed according to the concentration of the solution in which the PMMA is dissolved, a molecular weight of the PMMA, and spin coating conditions. Further, the area of the capacitor and the thickness of the dielectric layer may be designed suitable for the system to which the electro-optic modulator 1 is applied.

As described above, the polymer membrane 250 protects the graphene film 220 from damage during the manufacturing process, thereby enabling the transfer of high quality graphene. Referring to FIG. 4C, the Raman spectrum result for the graphene film 220 transferred after the polymer membrane 250 is coated is the best, among the examples of FIGS. 4B and 4C. Thus, when the graphene film 220 coated with the polymer membrane 250 is transferred, a high quality transfer result may be obtained as shown in FIG. 4C.

Figure 4D:
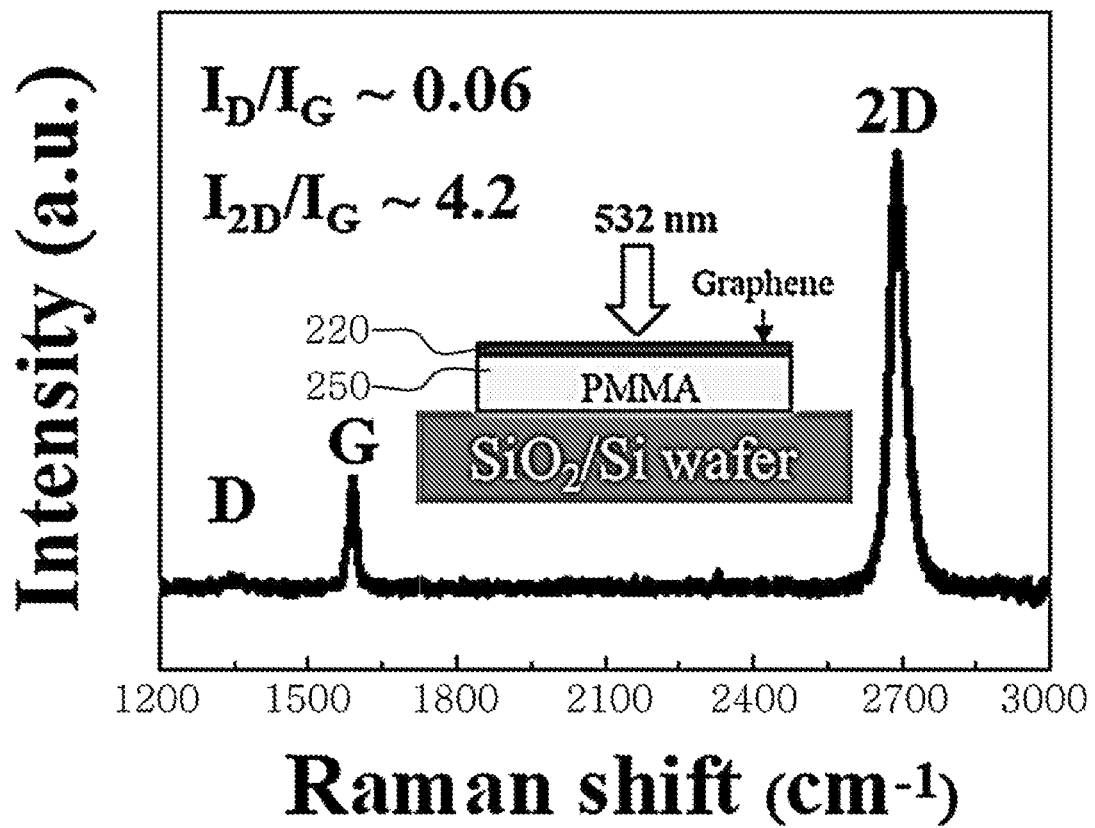
FIG. 4D shows a result obtained through a Raman spectrum of graphene coupled to a polymer according to an embodiment of the present disclosure.

FIG. 4d shows a result obtained by analyzing the graphene film 220 coupled to the PMMA using a 532 nm laser source by means of a Raman spectrum. Referring to FIG. 4D, the positions of a D peak, a G peak and a 2D peak are ~1349, ~1588 and 2691 cm$^{-1}$, respectively. The intensity ratio of the D peak and the G peak indicating the lattice crystallinity of graphene is 0.06, thus supporting that the corresponding graphene is high quality graphene with few defects with spa carbon atoms.

Figure 5A:
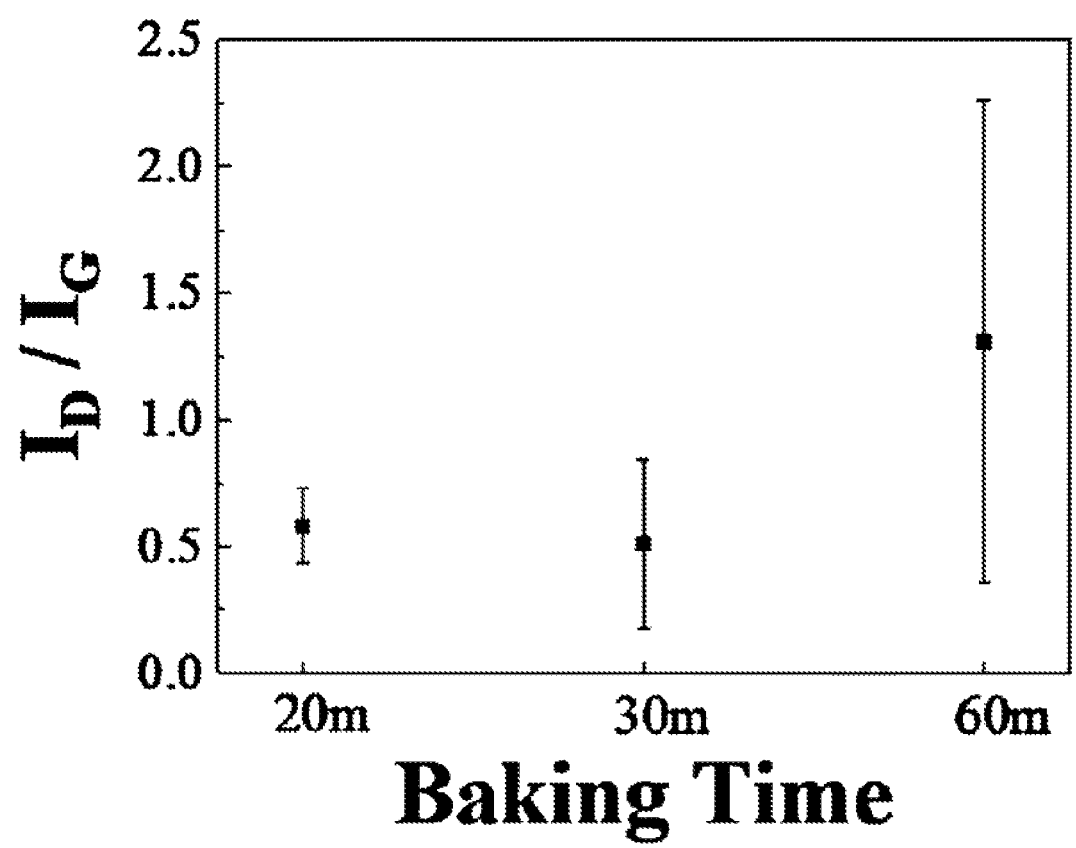
FIGS. 5A and 5B are diagrams showing results according to the graphene film transferring conditions according to an embodiment of the present disclosure.
Figure 5B:
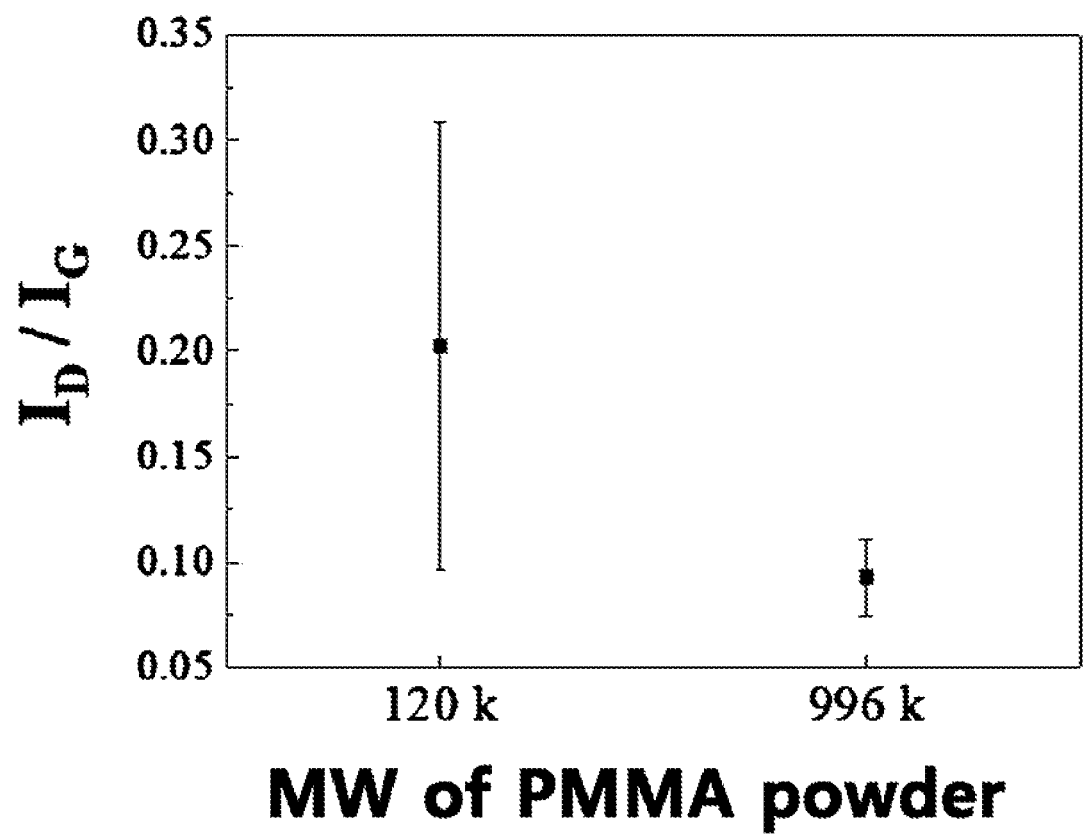

FIGS. 5A and 5B are diagrams showing results according to the graphene film transferring conditions according to an embodiment of the present disclosure.

In an embodiment, the performance of the electro-optic modulator 1 may be improved depending on the baking time of the PMMA after the transferring process. For example, the graphene film 220 stably transferred with good quality may be obtained through heating for 30 minutes.

In an embodiment, the performance of the electro-optic modulator 1 may be improved according to the molecular weight (MW) of the PMMA. As shown in FIG. 5B, if the transfer result using PMMA of 120 K having a relatively short chain is compared with the transfer result using PMMA of 996 K, the PMMA of 120 K is easily damaged during the transferring process and thus the graphene quality is seriously deviated, compared to the PMMA of 996 K that is stably transferred with good quality. That is, the graphene film 220 is transferred with high quality when being coated with the polymer membrane 250 made of PMMA having a relatively high molecular weight.

After the step S250, the copper foil 210 is removed (S260), and the graphene/polymer composite is transferred onto the oxide film 120 and any one of the two metal electrodes 132, 133, for example the metal electrode 132 (S280). Meanwhile, the polymer membrane 250 is not removed after the transferring process and functions as a dielectric layer of the electro-optic modulator 1.

In an embodiment, the step S280 may be performed by wet transfer. After the graphene film 220 coated with PMMA is transferred onto the substrate, the PMMA is heated to a temperature above a certain level (for example, above a glass transition temperature ($T_g$) of PMMA) to remove water molecules. By doing so, it is possible to improve the quality of contact between the graphene film 220 and the oxide film 120.

Figure 6A:
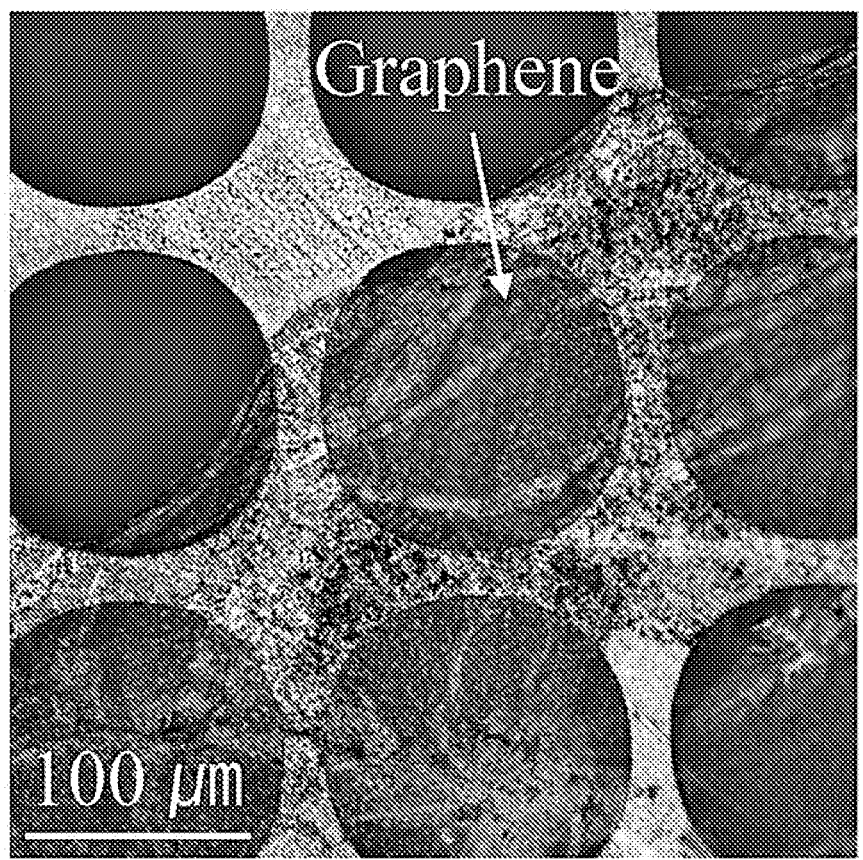
FIGS. 6A and 6B are photographs obtained through the TEM analysis on the transferred graphene film according to an embodiment of the present disclosure.
Figure 6B:
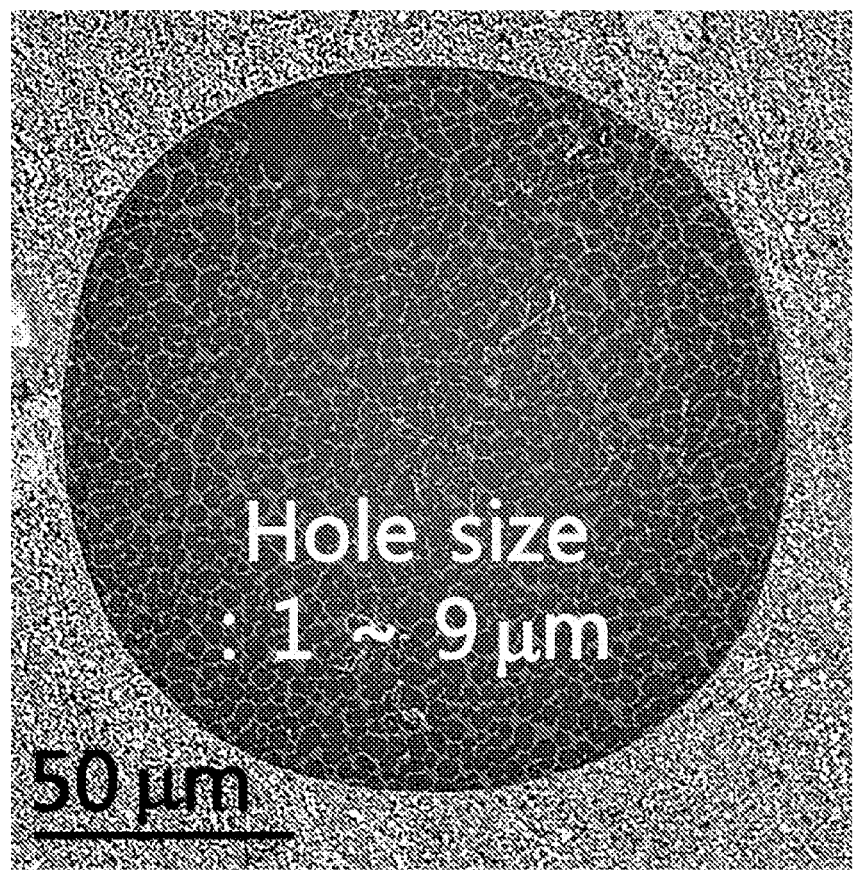

FIGS. 6A and 6B are photographs obtained through the TEM analysis on the transferred graphene film according to an embodiment of the present disclosure.

If the transferring process as described above is performed, it is possible to perform a high quality transfer without damaging the quality of the graphene film 220. Referring to FIGS. 6A and 6B showing the transferred graphene film 220 analyzed by a transmission electron microscope (TEM), it can visually checked that the graphene film 220 has high quality.

The graphene film 220 to be transferred is not necessarily limited to a monolayer. In an embodiment, it is possible to manufacture an electro-optic modulator 1 including a multilayer graphene film 220.

In addition, a graphene film 320 to be transferred onto another metal electrode 133 is synthesized (S310), and the graphene film 320 is transferred onto the polymer membrane 250 coated on the transferred graphene film 220 and another metal electrode 133 (S380). If two graphene films 220, 320 are provided, the nonlinearity of graphene increases about twice or more than that the case including a single graphene film.

The processes of synthesizing and transferring the graphene film 320 (S310 to S380) are similar to the above-described processes (S210 to S280) of synthesizing and transferring the graphene film 220, and will not described in detail here.

Figure 7:
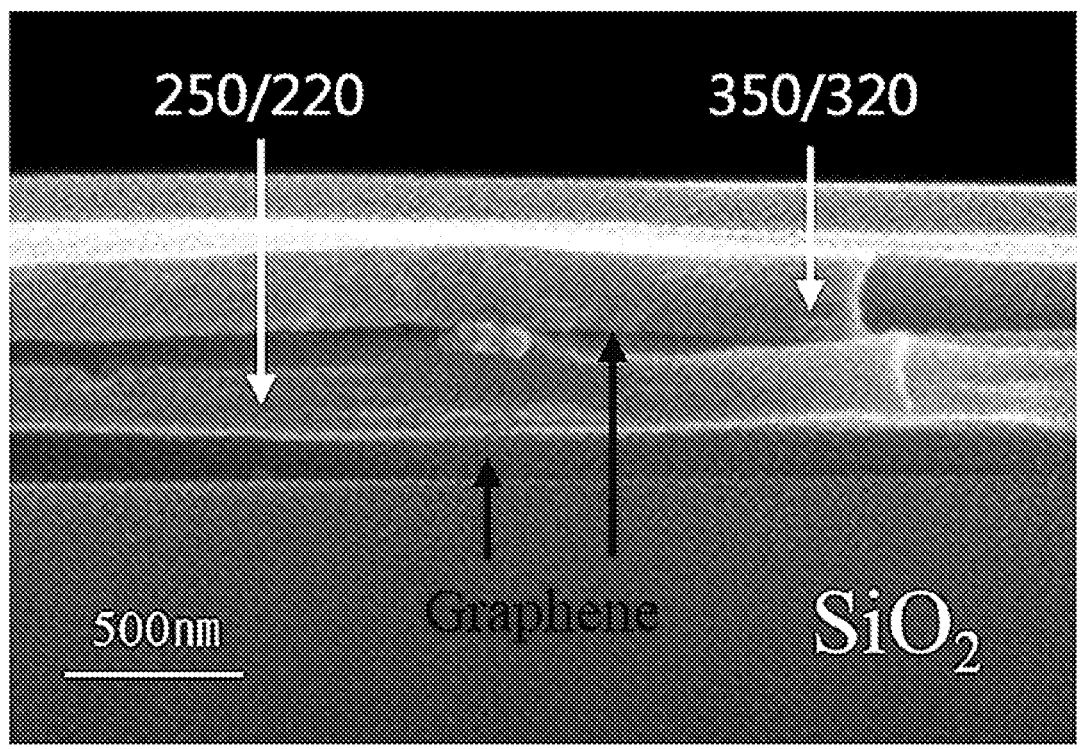
FIG. 7 is a photograph showing a cross section of an electro-optic modulator having two graphene films, obtained through the SEM analysis, according to an embodiment of the present disclosure.

FIG. 7 is a photograph showing a cross section of an electro-optic modulator having two graphene films 220, 320, obtained through the SEM analysis, according to an embodiment of the present disclosure. According to the above manufacturing method, the electro-optic modulator 1 having a capacitor structure of graphene-polymer-graphene may be manufactured. As shown in FIG. 7 obtained by the scanning electron microscope (SEM) analysis, a PMMA/graphene film composite having two layers overlapped through the transferring process may be formed flat on the a silicon (Si) substrate 110 having the oxide film 120 formed thereon. The graphene films 220, 320 are located below the PMMA membranes 250, 350, respectively.

Since the PMMA membranes 250, 350 block the graphene films 220, 320 from the external environment as described above, it is possible to give a physical and electrical passivation against the external environment. Thus, the PMMA membranes 250, 350 function as dielectric substances in the graphene capacitor structure, enable reliable operation of the electro-optic modulator 1, ensure stability, and minimize the damage of the graphene films 220, 320.

In another embodiment, the electro-optic modulator 1 may include a single graphene film. For example, the PMMA may be coated as a dielectric layer between two metal electrodes 132, 133, and a single graphene film may be electrically connected to any one of two metal electrodes 132, 133 in a capacitor structure. In addition, PMMA may be further coated to protect the single graphene film from the external environment.

The result of the transfer of the graphene films 220 and 320 is shown in FIG. 3 and FIG. 6, but the present disclosure is not limited thereto and may be formed in various forms to enable light modulation according to an electric signal.

The transferred graphene films 220, 320 may be formed as shown in FIGS. 3 and 6. However, the transferred graphene films 220, 320 may be formed in various ways capable of enabling enable light modulation according to an electric signal, without being limited thereto.

The steps illustrated in FIG. 3 are merely illustrative, and the electro-optic modulator 1 having the above-described function may be manufactured by various methods in which the steps are performed in different orders or a part of the steps is omitted or modified.

Experimental Example 1

Figure 8:
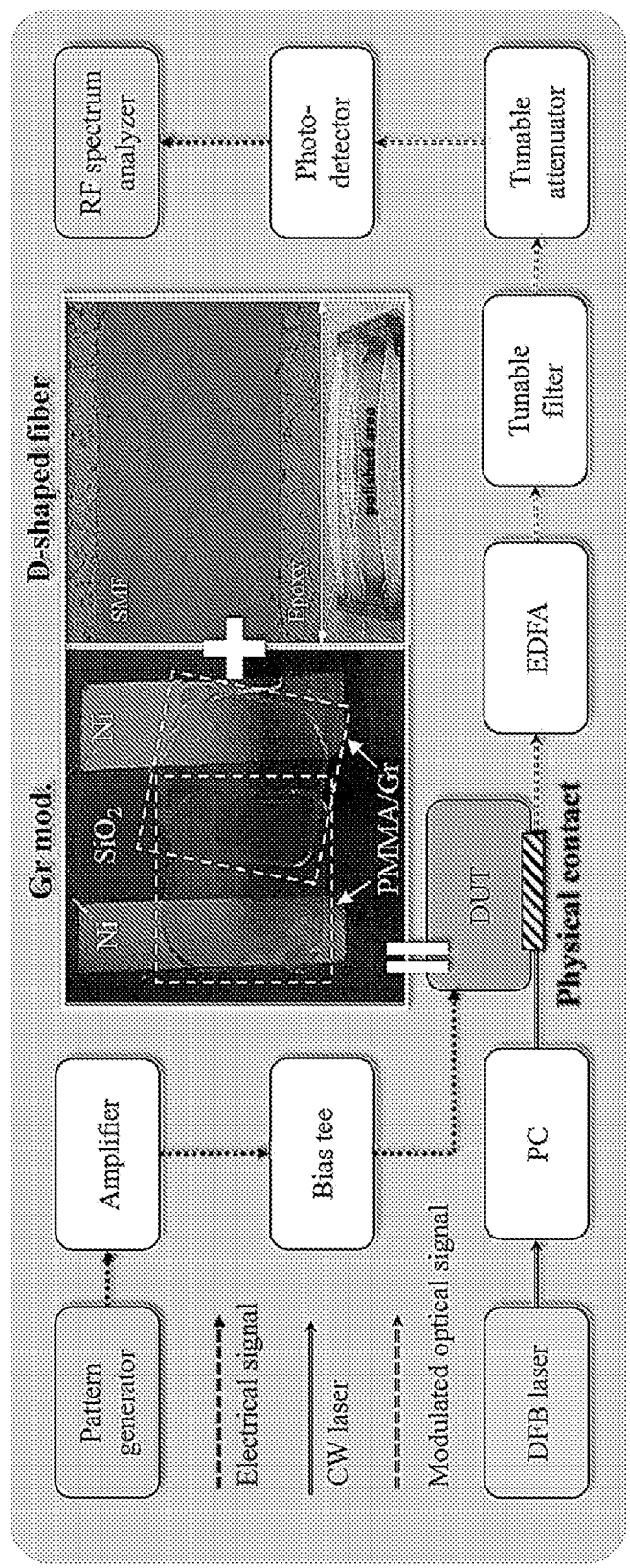
FIG. 8 is a diagram showing an optical system for analyzing characteristics of the electro-optic modulator according to an embodiment of the present disclosure.
Figure 9A:
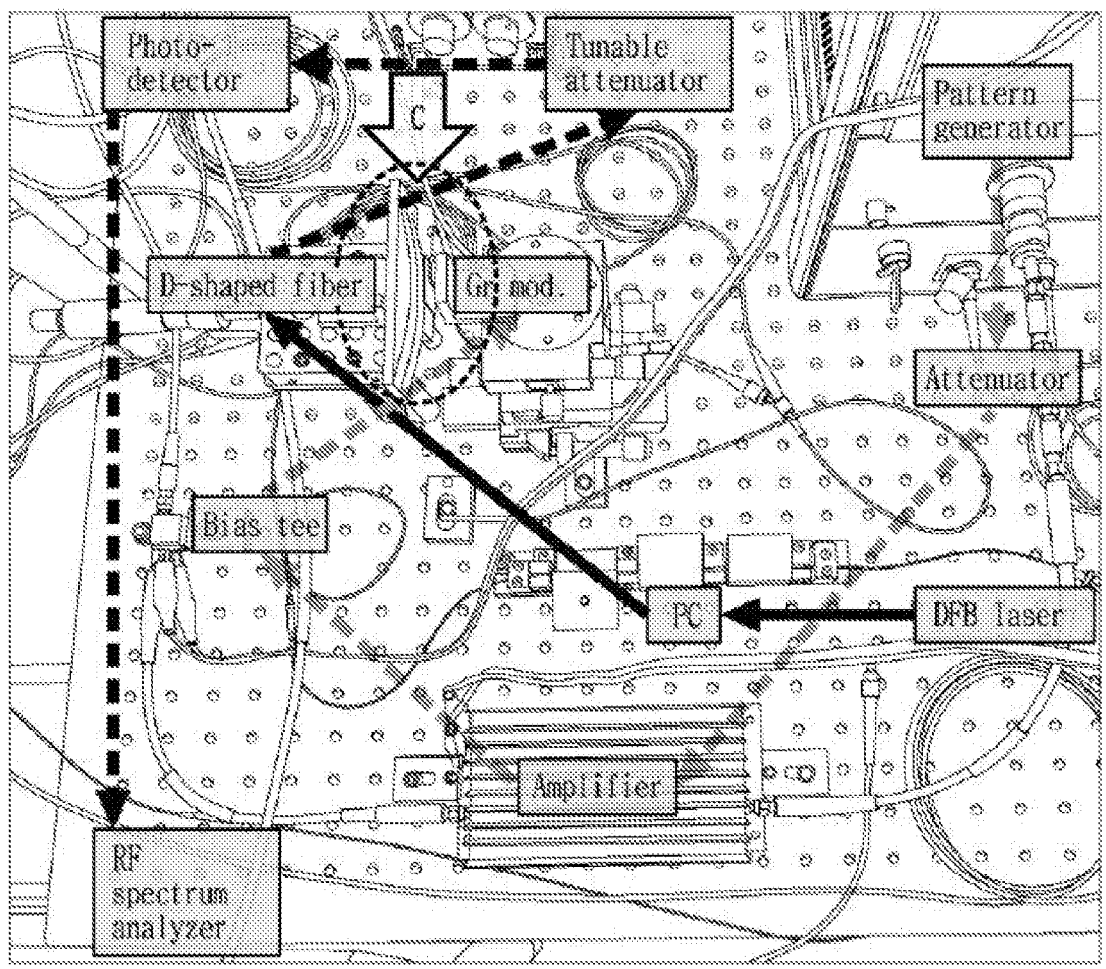
FIGS. 9A to 9C are diagrams showing an overall portion and a partial portion of a system, designed according to the system diagram of FIG. 8, according to an embodiment of the present disclosure.
Figure 9B:
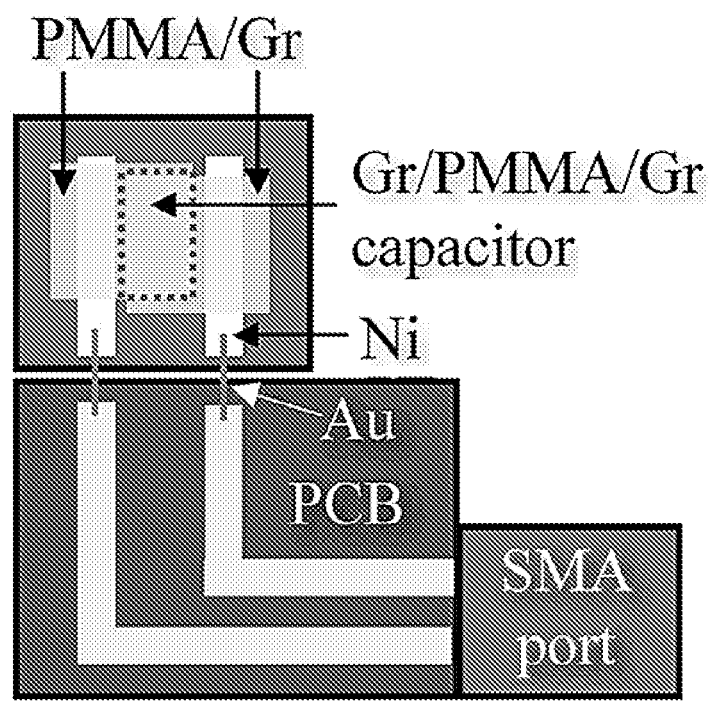
Figure 9C:
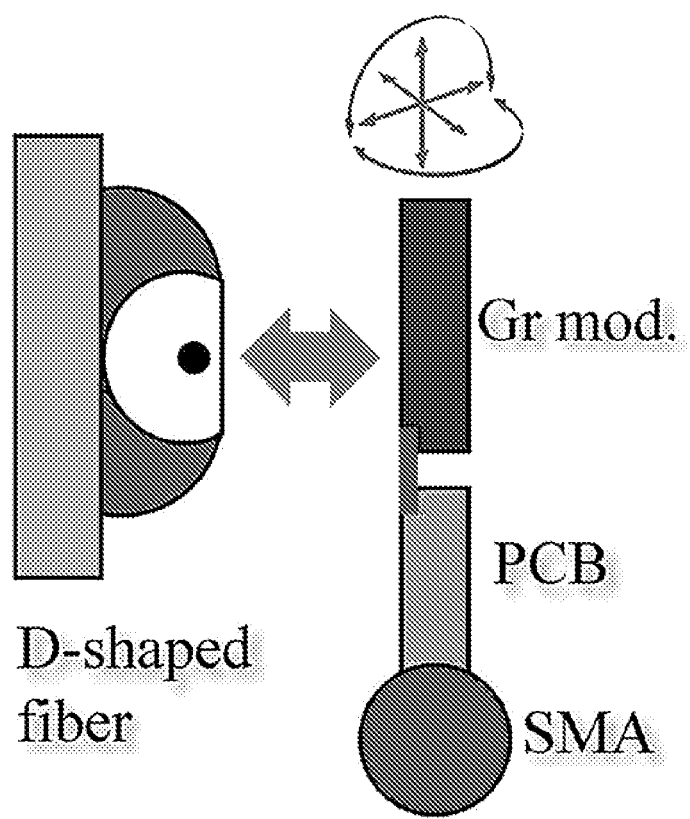

FIG. 8 is a diagram showing an optical system for analyzing characteristics of the electro-optic modulator according to an embodiment of the present disclosure, and FIGS. 9A to 9C are diagrams showing an overall portion and a partial portion of a system, designed according to the system diagram of FIG. 8, according to an embodiment of the present disclosure. The experimental example means an experiment to measure the performance of the electro-optic modulator 1 manufactured by the manufacturing method according to an embodiment of the present disclosure, in terms of the extinction ratio and the operating speed.

Referring to FIGS. 8 and 9A, the optical system includes an optical signal oscillator, an amplifier, a bias tee, a polarization controller (PC), and an optical waveguide.

The optical signal oscillator outputs a continuous wave (CW laser). In an embodiment, the optical signal oscillator is a DFB laser oscillator and may be MT9810A, produced by Anritsu, which is capable of outputting a continuous wave of a communication wavelength band with a center wavelength near 1550 nm. If the continuous wave is advanced into a D-shaped polished optical waveguide, its characteristics may be analyzed while modulating the light by adjusting the voltage applied to the electro-optic modulator 1 physically close to the polished surface. In addition, it is possible to compare and analyze the operating characteristics according to the size of the electro-optic modulator 1.

The optical system may further include a DC voltage generator, and the extinction ratio of the light by the electro-optic modulator may be measured through the optical system. In an embodiment, the DC voltage generator may be E36106A, produced by KEYSIGHT, and the OSA may be AQ6370C, produced by YOKOGAWA. In addition, the optical system may further include various analyzers, for example an optical spectrum analyzer (OSA), a photodetector, an RF spectrum analyzer and the like.

Since the graphene interacts only with an electric field in the plane direction of the advancing light, it is possible to control the state of polarization of the light applied to a device by means of the polarization controller. The intensity of the changing optical output may be measured through the OSA by applying a voltage to both ends of the capacitor structure of graphene-polymer-graphene while advancing the polarized light signal to the optical fiber in physical contact with the electro-optic modulator 1.

In the measurement of the operation speed, the optical system further includes a pattern generator, and an electric signal may be input to the optical system. In an embodiment, the pattern generator may be 33120A, produced by KEYSIGHT. The electric signal generated by the pattern generator to measure the operating speed is amplified through the amplifier, and then a bias voltage is applied using the bias tee. In an embodiment, the amplifier may be ZHL-6A+, produced by Mini-circuit, which is capable of amplifying a peak-to-peak voltage by about 20 V. The optical system may apply a bias voltage of 30 V through the bias tee. By doing so, it is possible to generate an electric signal that may have a maximum intensity of 10 V to 40 V and a frequency in the range of 100 kHz to 500 MHz. In this process, a sinusoidal electric signal generated with a single frequency may be applied to the electro-optic modulator 1 to convert the modulated optical signal into an electric signal through a photodetector, and its RF spectrum may be measured using a RF spectrum analyzer, namely N9000B.26G produced by KEYSIGHT.

The electro-optic modulator 1 used in the experimental example is manufactured by the following process as shown in FIG. 3.

The graphene film 220 is synthesized (S210). In the experimental example, two graphene films 220, 230 are synthesized on both surfaces of the 25 μm, 99.8% copper foil 210. produced by Alfa Aesar, by CVD.

After that, the graphene film 220 serving as a graphene film for transfer is spin-coated by means of the polymer membrane 250 (S250). Then, the graphene film 230 having a relatively low quality is removed by a reactive ion etching ($O_2$ RIE) process using oxygen for 2 minutes at an intensity of 150 W.

The polymer membrane 250 is made of PMMA (MW, 996 k), produced by Sigma Aldrich, which is dissolved in chlorobenzene having a 99.8% anhydrous component, produced by Sigma Aldrich, in a concentration of 46 mg/mL.

After that, the copper foil 210 is etched by being immersed in 0.1M ammonium persulfate, CAS No. 7727-54-0, for about 18 hours (S260), and the remaining etchant is washed three times in the distilled water for 30 minutes and then transferred onto a desired substrate (S280). After the graphene/PMMA composite is transferred, nitrogen gas is sprayed for several seconds and heated at the glass transition temperature ($T_g$) or above of the PMMA for about 30 minutes to remove the remaining water molecules. The other graphene film 320 is also synthesized by a similar process (S310 to S380) and transferred.

By the transferring process, the synthesized graphene films 220, 320 are transferred two times to form a capacitor structure of graphene-polymer-graphene whole respectively overlapping with two nickel (Ni) electrodes 132, 133 deposited in 50 nm thickness to the SYSN04T1-10NA silicon (Si) substrate 110, produced by Silicon Technology Corp., by means of an electron beam evaporator, on which the oxide film 120 having 300 nm thickness is formed along with the PMMA membranes 250, 350.

Referring to FIG. 9B, in order to efficiently transmit the electrical signal to the graphene, a PCB substrate connectable to a SMA cable is designed to be connected to the nickel (Ni) electrodes 132, 133, which are in contact with both graphene films 220, 320 having a capacitor structure of the graphene-polymer-graphene, through a gold wire (Au wire).

Referring to FIG. 9C, the optical waveguide included in the optical system is an optical fiber having a partially polished surface (D-shaped fiber). Here, the optical fiber is a single-mode optical fiber (Corning, SMF-28e), and the optical fiber is fixed to an acryl support designed to have a suitable curvature radius, and then its uppermost cladding layer is polished by a LF03P sandpaper, produced by Thorlabs.

In addition, in order to obtain a more accurate analysis result by aligning with the optical waveguide, the electro-optic modulator 1 is fixed on a stage coupling set which may finely adjust the position in 5-axis. The stage coupling set includes a TSD-605C translation stage, produced by SIGMAKOKI, a KSP-606M rotation stage, produced by SIGMAKOKI, and a GOH-60A50 goniometer stage, produced by SIGMAKOKI.

FIGS. 10A to 10F are diagrams showing results of measuring the operation performance of the electro-optic modulator according to an embodiment of the present disclosure.

In the experimental example, when measuring the output intensity of the optical signal passing through the electro-optic modulator 1, the optical signal is a CW laser with a center wavelength of 1552.04 nm, generated from the optical signal oscillator. Since the graphene interacts only with the electric field in the plane direction of the traveling optical signal, the polarization direction applied to the device is adjusted through the polarization controller, and then the optical signal is advanced to the optical fiber in physical contact with the electro-optic modulator 1.

Figure 10A:
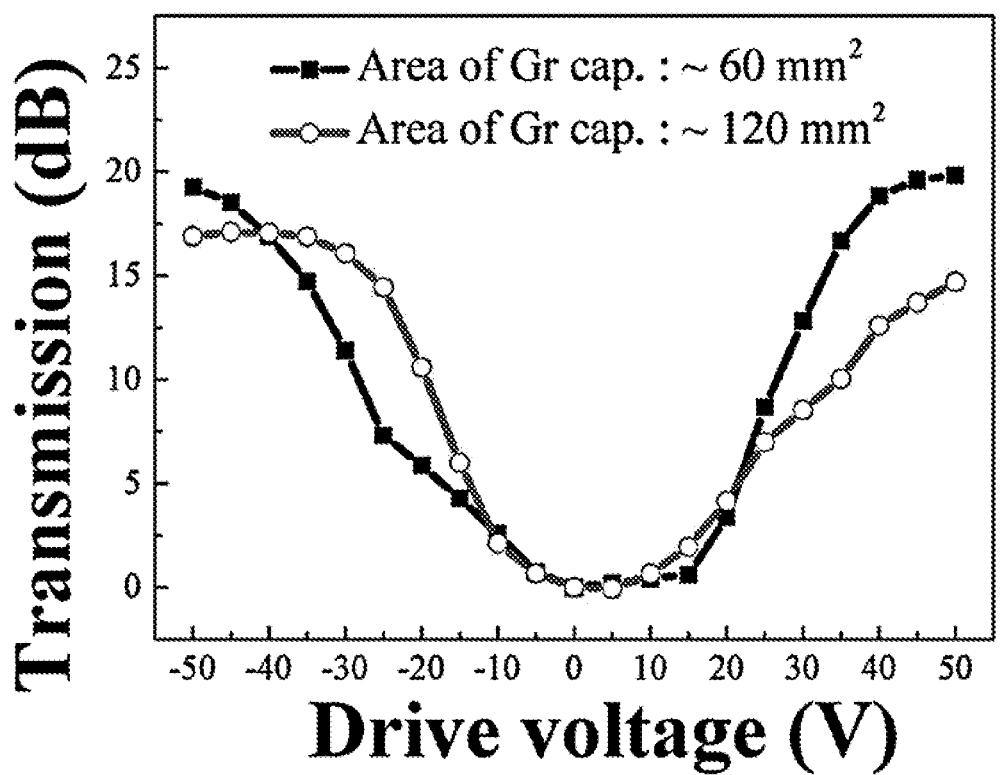
FIGS. 10A to 10F are diagrams showing results of measuring the operation performance of the electro-optic modulator according to an embodiment of the present disclosure.
Figure 10B:
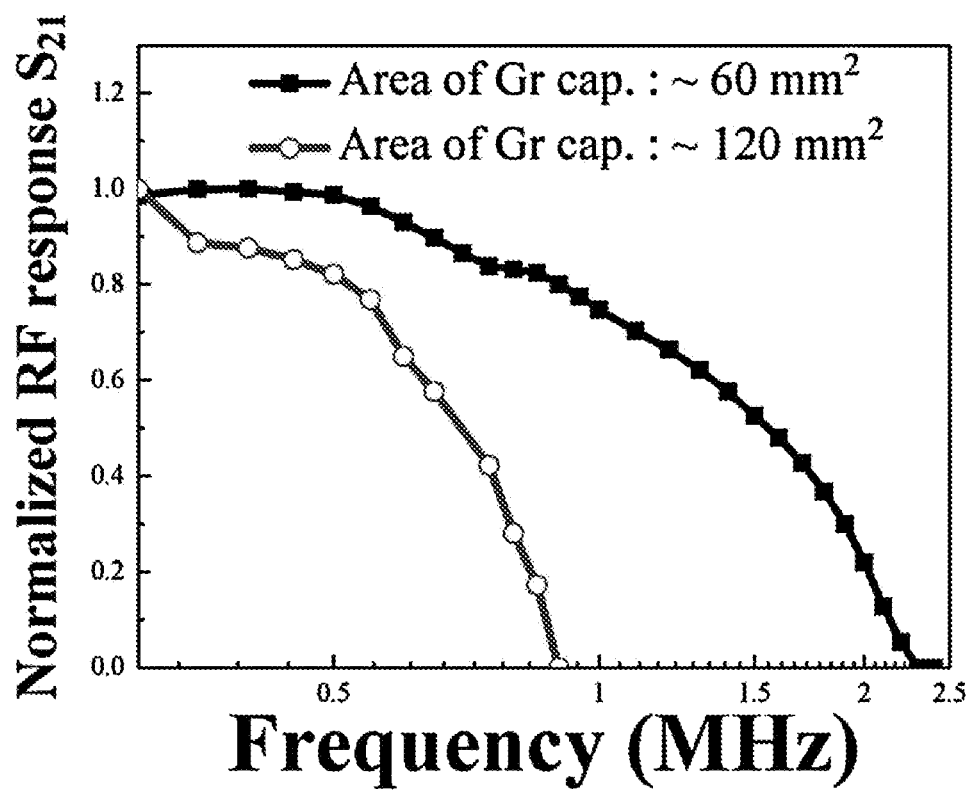
Figure 10C:
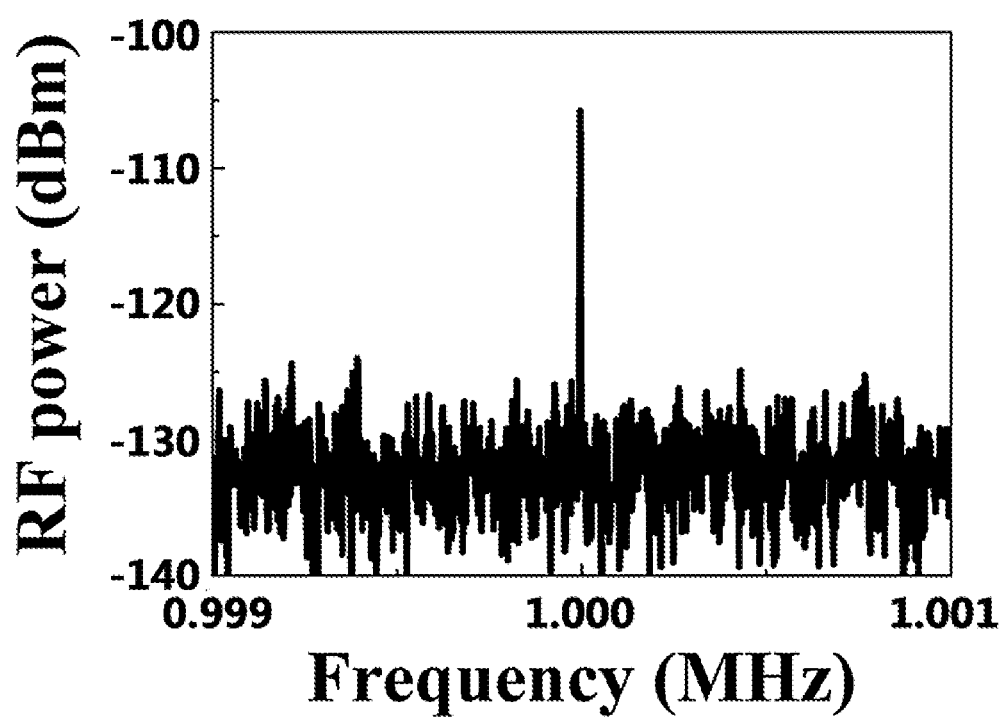
Figure 10D:
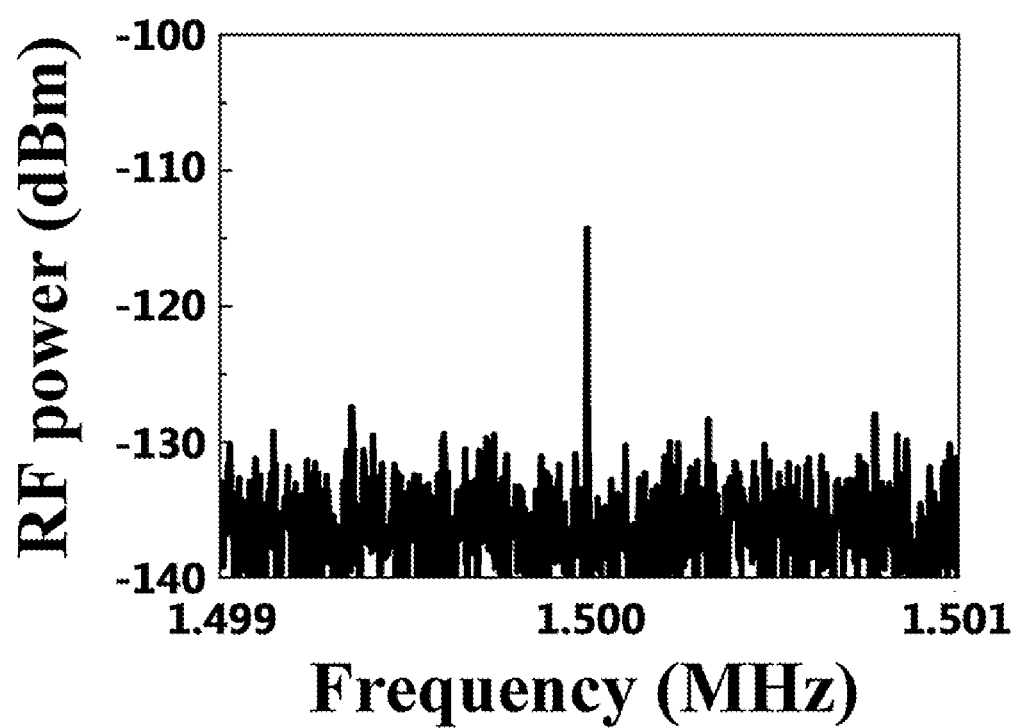
Figure 10E:
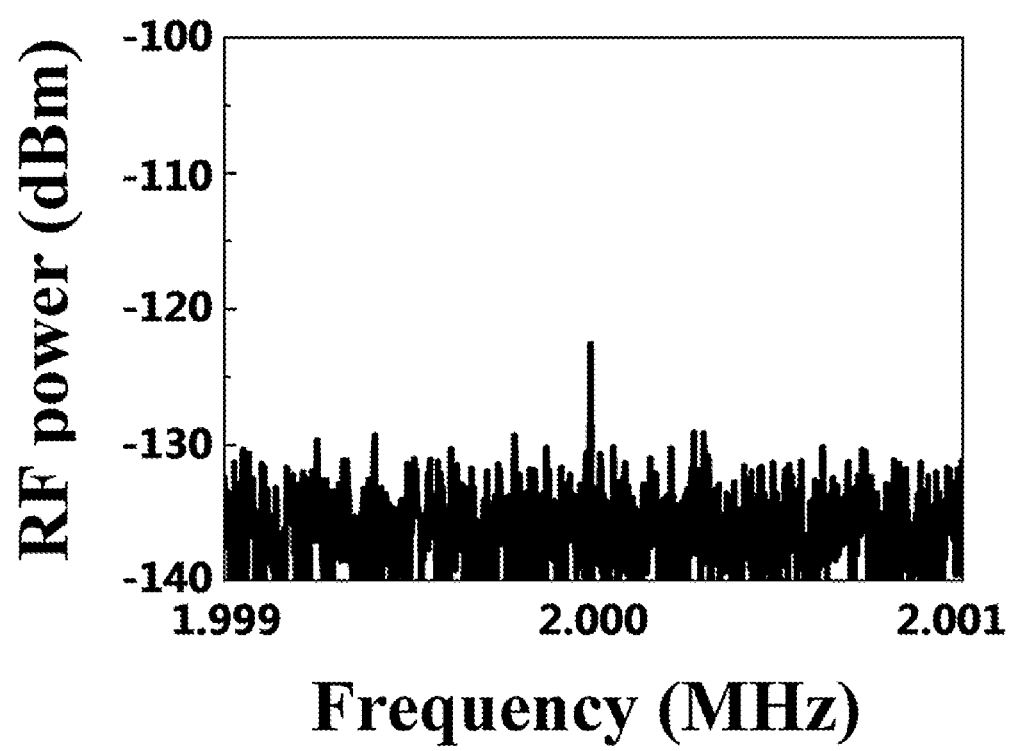

Referring to FIG. 10A, if the graphene capacitor area of the electro-optic modulator 1 is 60 $mm^2$, the modulated optical signal has an extinction ratio of 20 dB. In addition, referring to FIG. 10B, if the graphene capacitor area is 60 $mm^2$, the electro-optic modulator 1 may operate up to about 2.5 MHz.

Figure 10F:
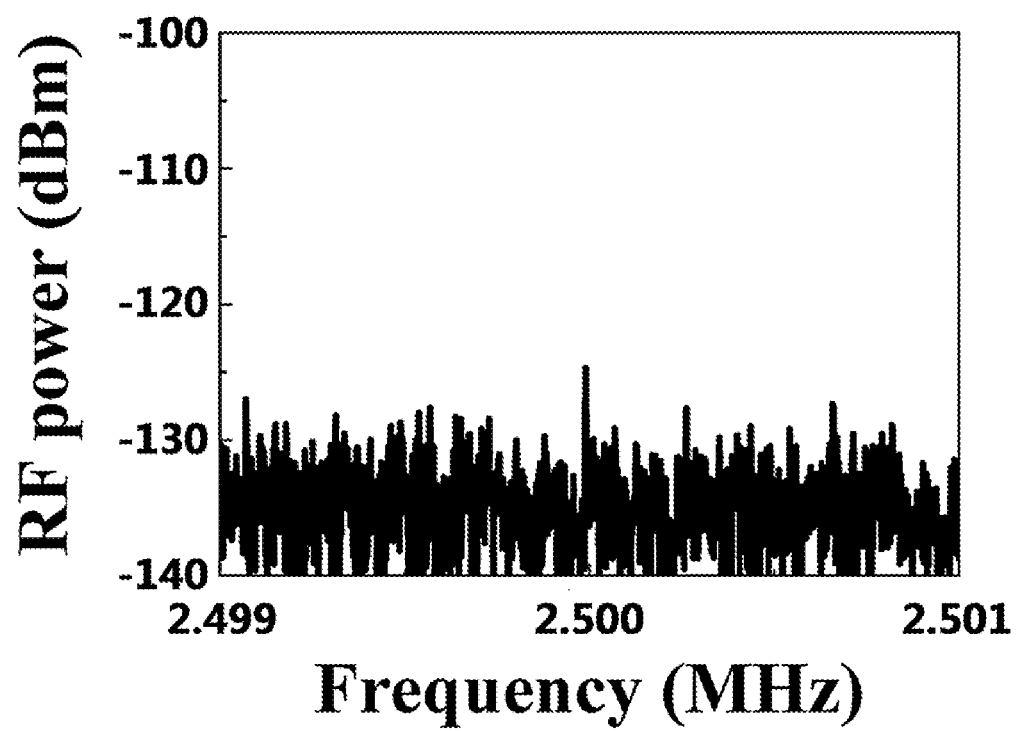

In addition, the electro-optic modulator 1 with a graphene capacitor area of 60 $mm^2$ has a frequency of 1 MHz, 1.5 MHz, 2 MHz. In addition, if an electric signal of 2.5 MHz is applied, as shown in FIGS. 100 to 10F, the electro-optic modulator 1 may modulate the intensity of the optical signal to 20 dB, 16 dB, 8 dB and 5 dB, respectively.

As a result, the electro-optic modulator 1 manufactured according to an experimental example has an extinction ratio of 20 dB and an operating speed performance in MHz.

The optical system for measuring the performance of the electro-optic modulator 1 is not limited in terms of performance and components, and may further include components not illustrated in FIGS. 8 and 9A to measure various kinds of performances.

Although the present disclosure has been described with reference to the embodiments shown in the drawings, it should be understood that various changes and modifications can be made thereto by those skilled in the art without departing from the scope of the present invention. However, such modifications should be considered to fall within the technical protection of the present disclosure. Accordingly, the true scope of the present disclosure should be determined by the technical idea of the appended claims.

The electro-optic modulator according to an embodiment of the present disclosure is physically freely attachable and detachable, and may modulate an optical signal when contacting an optical waveguide. Also, the quality of the modulated optical signal is remarkably excellent as described above.

In addition, even though the number of modulators is limited, the limited number of modulators are applicable to a greater number of optical systems, and further, the modulation position and the number of optical signal channels to be modulated may be additionally controlled.

The electro-optic modulator broadens the design of optical systems for users and may help reconfigure already designed systems more easily. Thus, it is expected that the present disclosure can be utilized unlimitedly in designing optical systems.

What is claimed is:

1. A method for manufacturing a graphene electro-optic modulator that modulates a light according to an electric signal, the method comprising:
    forming two metal electrodes on an oxide film formed on a substrate, the two metal electrodes being spaced apart from each other;
    synthesizing a first graphene film at a metal foil;
    coating the first graphene film with a polymer membrane;
    removing the metal foil at which the first graphene film is synthesized; and
    transferring the first graphene film coated with the polymer membrane onto the oxide film,
    wherein the first graphene film is electrically connected to any one of the two metal electrodes.

2. The method according to claim 1, further comprising:
    synthesizing a second graphene film at a metal foil;
    coating the second graphene film with a polymer membrane;
    removing the metal foil at which the second graphene film is synthesized; and
    transferring the second graphene film coated with the polymer membrane onto the polymer membrane coated on the first graphene film,
    wherein the second graphene film is electrically connected to the metal electrode to which the first graphene film is not connected.

3. The method according to claim 1,
    wherein the synthesizing the first graphene film includes:
    growing graphene films on both surfaces of the metal foil; and
    removing the graphene film grown on one surface of the metal foil,
    wherein the first graphene film is the graphene film not removed.

4. The method according to claim 3,
    wherein the coating the first graphene film with a polymer membrane is performed before the removing the graphene film.

5. The method according to claim 1, further comprising:
    coating a part of the oxide film and one of the metal electrode with a polymer membrane, before transferring the first graphene film.

6. The method according to claim 1, further comprising:
    heating the polymer membrane, after transferring the first graphene film.

7. A graphene electro-optic modulator for modulating a light according to an electric signal, comprising:
    an oxide film formed on a substrate;
    two metal electrodes disposed on the oxide film to be spaced apart from each other;
    a first graphene film transferred onto the oxide film; and
    a first polymer membrane coated on the graphene film,
    wherein the first graphene film is electrically connected to any one of the two metal electrodes.

8. The graphene electro-optic modulator according to claim 7, further comprising:
    a second graphene film transferred onto the first polymer membrane; and
    a second polymer membrane coated on the second graphene film,
    wherein the second graphene film is electrically connected to the metal electrode to which the first graphene film is not connected.

9. The graphene electro-optic modulator according to claim 7, further comprising:
    a second polymer membrane provided between the first graphene film and the oxide film.

10. The graphene electro-optic modulator according to claim 7,
    wherein the first polymer membrane is made of poly (meth)acrylates (PMMA).

11. The graphene electro-optic modulator according to claim 10,
    wherein the PMMA has a molecular weight of 996 K.

12. A system, comprising:
    a graphene electro-optic modulator defined in claim 7;
    an oscillator configured to oscillate a light signal;
    a generator configured to generate the electric signal;
    an amplifier configured to amplify the electric signal;
    a bias tee configured to apply a bias voltage to the electro-optic modulator based on the electric signal; and
    an optical waveguide having a core and a cladding layer,
    wherein the cladding layer is at least partially polished, and the graphene electro-optic modulator is in contact with the polished portion of the cladding layer.

* * * * *